US008411797B2

(12) United States Patent
Suissa et al.

(10) Patent No.: US 8,411,797 B2
(45) Date of Patent: Apr. 2, 2013

(54) FREQUENCY OFFSET COMPENSATION IN A DIGITAL FREQUENCY SHIFT KEYING RECEIVER

(75) Inventors: Udi Suissa, Givataim (IL); Oren Eliezer, Plano, TX (US); Michael Vinokur, Kiryat Ono (IL)

(73) Assignee: Texas Instruments Incorporated, Dallas, TX (US)

( * ) Notice: Subject to any disclaimer, the term of this patent is extended or adjusted under 35 U.S.C. 154(b) by 1701 days.

(21) Appl. No.: 10/766,448

(22) Filed: Jan. 27, 2004

(65) Prior Publication Data
US 2005/0164639 A1   Jul. 28, 2005

(51) Int. Cl.
*H04L 25/10*   (2006.01)
(52) U.S. Cl. ........................... 375/319; 375/340
(58) Field of Classification Search .......... 375/319, 375/317, 346, 334, 344; 329/300, 318, 320; 455/63.1; 327/307, 59, 62; 330/9; 331/34, 331/36 C
See application file for complete search history.

(56) References Cited

U.S. PATENT DOCUMENTS

| | | | | |
|---|---|---|---|---|
| 5,550,868 | A * | 8/1996 | Boccuzzi | 375/330 |
| 5,652,541 | A * | 7/1997 | Yang et al. | 329/300 |
| 6,724,834 | B2 * | 4/2004 | Garrett et al. | 375/317 |
| 6,882,208 | B1 * | 4/2005 | Suissa et al. | 327/307 |
| 6,907,202 | B1 * | 6/2005 | Ide et al. | 398/208 |
| 7,120,390 | B2 * | 10/2006 | Grundvig et al. | 455/41.2 |
| 2002/0085649 | A1 * | 7/2002 | Hwang | 375/319 |
| 2003/0058964 | A1 * | 3/2003 | Ezquerra-Moreu et al. | 375/319 |
| 2003/0133518 | A1 * | 7/2003 | Koomullil et al. | 375/326 |
| 2008/0089443 | A1 * | 4/2008 | Sanada et al. | 375/319 |

* cited by examiner

*Primary Examiner* — Aristocratis Fotakis
(74) *Attorney, Agent, or Firm* — Ronald O. Neerings; Wade James Brady, III; Frederick J. Telecky, Jr.

(57) ABSTRACT

A digital nonlinear adaptive mechanism for frequency offset compensation for use in a digital Frequency Shift Keying (FSK) receiver such as a Bluetooth GFSK receiver. The mechanism is intended to aid in the recovery of a frequency-modulated signal in the presence of an unknown additive frequency offset, which could be greater than the peak frequency deviation and which must be suppressed to enable proper data recovery in the receiver. The mechanism utilizes a demodulator to convert the frequency offset into a digitally represented DC level. This level is extracted by a non-linear estimator based on peak detectors and filters. Active suppression of the DC level is achieved by feed-forwarding the estimated value into a subtractor that removes it from the digital signal. A gear shift mechanism incorporated within the DC estimation block enables the dynamic control of the DC estimation process. Charge and discharge coefficients are configured dynamically to provide fast frequency offset compensation during the reception of the redundant header at the beginning of a packet and relatively slow frequency offset compensation during the subsequent reception of the payload portion of the packet, thus minimizing both the acquisition time and the payload's BER in the receiver.

20 Claims, 7 Drawing Sheets

LISTING 1

```
IF AFTER_SYNC
    MAX_KCH = 2⁻⁷;
    MAX_KDS = 2⁻⁸;
    MIN_KCH = 2⁻⁷;
    MIN_KDS = 2⁻⁸;

ELSE
    MAX_KCH = 2⁻²;
    MAX_KDS = 2⁻⁸;
    MIN_KCH = 2⁻²;
    MIN_KDS = 2⁻⁸;

END
IF (MAX_PEAK(K)-MIN_PEAK(K)) >350
    MAX_KDS = 2⁻²;
    MIN_KDS = 2⁻²;

ELSEIF (MAX_PEAK(K)-MIN_PEAK(K)) <100
    MAX_KCH = 2⁻¹;
    MIN_KCH = 2⁻¹;
```

FIG.5

FREQUENCY OFFSET COMPENSATION IN A DIGITAL FREQUENCY SHIFT KEYING RECEIVER

FIELD OF THE INVENTION

The present invention relates to the field of data communications and more particularly relates to a method of and apparatus for frequency offset compensation in a digital frequency shift keying (FSK) receiver.

BACKGROUND OF THE INVENTION

In digital communications systems, a carrier signal is modulated with the digital data to be transmitted over the channel, where it typically suffers various forms of distortion, such as additive noise. The digital data is often transmitted in bursts wherein each burst consists of a number of data bits. Upon reception, the signal must be demodulated in order to recover the transmitted data.

It is common for receivers to employ direct conversion (i.e. homodyne receiver) to perform the demodulation of the received signal. The received signal is mixed with a local oscillator signal at the carrier frequency to produce I (in-phase) and Q (quadrature) baseband signals. An advantage of direct conversion receivers is that they are efficient in terms of cost and current consumption. The advantage is derived from having the incoming RF signal directly downconverted to baseband, in both I and Q components, without use of any IF frequencies.

In other receivers, the incoming RF signal is mixed down first to an intermediate frequency (IF) signal and subsequently to baseband. The IF frequency may be any convenient frequency. For example, in a Bluetooth receiver, the front-end may output a low frequency IF signal (e.g., Near-Zero IF, which is 0.5 MHz, since the signal's bandwidth is 1 MHz).

One of the errors commonly introduced into the signal is frequency offsets. The errors may be introduced at both the transmitter and the receiver. An example baseband signal that is recovered in the absence of frequency offsets is shown in FIG. 1A. The FSK baseband signal 40 is a filtered baseband signal filtered with a Gaussian filter in accordance with the Bluetooth specifications. The baseband signal is recovered by the detector and is ready for further processing including slicing, equalization, etc. Note that the frequency deviations representing the '0' and '2' symbols are centered around zero and extend to $\pm R_b h = \pm 160$ kHz where h is the modulation index (e.g., 0.32) and $R_b$ is the data rate (e.g., 1 Msps). The output signal which is recovered in the presence of frequency offsets is as shown in FIG. 1B.

Note that in the example embodiment presented here, fixed frequency offsets translate to a constant DC level at the output of the demodulator. The frequency offsets, however, are not always constant and may vary over time. The variations in frequency offset translate to variations in the DC level, such as the slowly decaying DC level shown in FIG. 1B, corresponding to a frequency droop in the received signal (the Bluetooth specifications allow as much as ±40 kHz of frequency droop in a long packet). The signal 42 rides on a DC or near DC (low frequency) signal with a range defined by the maximum peaks 44 and minimum peaks 46. Depending on the type of detector used, frequency offsets could be translated into either DC offsets, which may be fixed or vary at a low rate, or into other distortions on the recovered signal which would typically be more difficult to eliminate.

Considering FSK modulation without any frequency offset errors, the signal output from the transmitter can be expressed mathematically by the following.

$$I = A \cos(\omega_c t + \phi(t) + \theta) \quad (1)$$

where A is a constant, $\omega_c$ represents the carrier signal, $\phi(t)$ represents the data and $\theta$ represents random noise. I is the signal after downconversion from RF to IF wherein the local oscillator frequency is given by $LO = \omega_C - \omega_{IF}$ where $\omega_{IF}$ denotes the IF frequency, which is 500 kHz in a Near-Zero IF Bluetooth receiver. The downconverted signal is expressed mathematically as follows.

$$I = A \cos(\omega_{IF} t + \phi(t) + \theta) \quad (2)$$

After downconversion from IF to zero-IF, the output signal is given by $$I = A \cos(\phi(t) + \theta) \quad (3)$$

Differential detection of this signal calculates $$(\phi(t) + \theta(t)) - (\phi(t-T) + \theta(t-T)) \Rightarrow \Delta\phi \quad (4)$$

where T represents the symbol time. In Bluetooth systems, the symbol time T is 1 microsecond. The result of differential detection yields $\sin(\Delta\phi)$, which for small values of $\phi$ can be approximated as simply $\Delta\phi$.

In the real world, however, frequency offsets are introduced causing distortion of the received signal. Considering a communication system constructed in accordance with the Bluetooth standard, the receiver must be constructed to deal with frequency offsets in order to generate a reliable output signal (i.e. minimize the number of erroneous bits in the recovered data). There exist several sources of frequency offset errors in a Bluetooth communication system as highlighted below.

First, the Bluetooth specification permits a frequency error of up to 75 kHz in carrier frequency of the transmitted signal. Second, an additional frequency offset of up to 50 kHz may be added by the receiver's local-oscillator as a result of up to 20 ppm of frequency error that its crystal reference may have. Further, a third contributor of up to 40 kHz of frequency drift may be resulting from the frequency droop allowed by the Bluetooth specifications for packets occupying 3-5 time slots. Lastly, a fourth contributor of up to 15 kHz of frequency error may be resulting from frequency variations in the receiver clocks as a result of them being derived from the frequency-hopping RF signal (in a specific implementation). This last contributor could be avoided by using accurate fixed clocks rather than division of the frequency-varying RF signal at the output of the LO frequency synthesizer.

Thus, an input signal may have a total of ±180 kHz in frequency offset. Considering a peak frequency deviation of +/−160 kHz for a modulation index of 0.32, a possible frequency offset of 180 kHz makes reception virtually impossible. Note that using a modulation index of 0.28, which is allowed by the Bluetooth specifications, resulting in only 140 kHz of peak frequency deviation, makes the problem even worse.

If the frequency offset is represented by $\Delta\omega_{IF}$, the expression for the downconversion to IF is as follows.

$$I = A \cos((\omega_{IF} + \Delta\omega_{IF})t + \phi(t) + \phi) \quad (5)$$

After the second downconversion to zero-IF, the output can be expressed as $$I = A \cos(\Delta\omega_{IF}(t) + \phi(t) + \theta) \quad (6)$$

Differential detection of this signal yields $\sin(\Delta\phi + \Delta\omega_{IF} T)$ which is the baseband signal corrupted by frequency offset errors. The second term represents a phase added to the signal caused by the frequency offset. Thus, in a symbol time of 1 microsecond, a frequency offset of 180 kHz yields a phase error of $0.36\pi$ radians. Considering a phasor representation of the FSK signal, the frequency offset causes the rotation to speed up or slow down to the point where the received signal cannot be distinguished from the frequency offset thus preventing proper reception of the received signal.

Prior art frequency offset compensation schemes are typically based on closed loop solutions in which the frequency of a local oscillator used for downconversion is adjusted. In a receiver implemented digitally, involving a second downconversion stage, frequency offset correction circuits are typically implemented using a numerically controlled oscillator (NCO) in some form of closed loop feedback arrangement whereby feedback control of the NCO must be synchronized with the detected frequency offset. This solution is difficult in a receiver with multistage processing latency delays along the path and is also unattractive in terms of complexity and therefore size, cost and current consumption. Due to the long delay loop, stabilization is problematic and in addition, it is too late to apply the correction to the data that has already been downconverted and stored in various buffers in the receiver processing stages.

In other prior art solutions, the frequency offset is translated to a phase shift in the constellation of the received signal. The phase shift is typically removed utilizing various complex digital signal processing techniques.

Thus a reduced-complexity mechanism is needed that is able to maintain a target BER<0.1% performance at −85 dBm (a typical sensitivity level specified for the receiver) despite the frequency offsets which may be present, potentially exceeding the frequency deviations of the modulation itself.

SUMMARY OF THE INVENTION

The present invention solves the problem of frequency offsets in the receiver by providing a digital automatic frequency control (AFC) employing a frequency offset compensation mechanism. The AFC of the present invention is based on a digital nonlinear adaptive mechanism that uses DC estimation and compensation in a feed-forward manner to substantially eliminate the effects of the frequency offsets within a relatively short period of time, thus minimizing the performance degradation in the data recovery of the received packets. The mechanism can be used, as shown in an example embodiment, in a multi-stage scheme to perform frequency offset compensation of an input signal in more than one step for use by subsequent processing stages. The mechanism is based on translating the frequency offsets in the signal to DC offsets, as an ideal FM demodulator would, and then compensating for them by means of DC estimation and elimination. A gear shift mechanism is also incorporated that enables (1) fast frequency offset compensation which is used for reception of the beginning portion of the packet (the 4-bit short preamble of the Bluetooth access code is insufficient for DC estimation in the presence of noise, but the 64-bit access code itself is somewhat redundant and relatively higher performance-degradation in its recovery can be tolerated) and (2) relatively slow frequency offset compensation during reception of the payload portion of the packet, wherein the mechanism only needs to be fast enough to accommodate up to 40 Hz/μsec of maximum frequency drift rate that the Bluetooth specification permits.

The DC estimation mechanism used to perform frequency offset compensation is based on maximum and minimum peak determination and tracking. For both the I and Q data paths, the maximum and minimum peaks are found and averaged to generate a DC estimate. The DC estimate represents the frequency offset error to be compensated. The DC estimate is then subtracted from the input signal to yield a frequency offset compensated output signal.

A key advantage of the present invention is that the frequency offset compensation mechanism does not require a closed loop configuration to operate. Rather, the mechanism utilizes an open loop configuration in a feed-forward scheme. This greatly simplifies not only the implementation of the mechanism but also simplifies and accelerates the simulation based development and verification of the mechanism. The mechanism accelerates correction of frequency offsets right from the beginning of reception and within two to three symbols. Another benefit to using an open loop feed-forward scheme is that delay and stability problems, which are typical of closed loop schemes are now eliminated.

Translating frequency offsets to DC offsets makes compensation significantly easier than compensating for phase offsets having nonlinear sine and cosine terms, which could be necessary for other receiver architectures. Furthermore, the scheme does not need to deal with problems of wrap around and distortions that exist when frequency offsets are translated to phase offsets.

Yet another advantage of the mechanism of the present invention is that the use of an adaptive and configurable gear shift mechanism makes the mechanism readily configurable and controllable during operation. This offers a clear advantage over conventional mechanisms having fixed characteristics.

Note that many aspects of the invention described herein may be constructed as software objects that are executed in embedded devices as firmware, software objects that are executed as part of a software application on either an embedded or non-embedded computer system running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the present invention, a method of frequency offset compensation, the method comprising the steps of receiving an input signal wherein frequency offsets have been translated to DC offsets, first determining a current maximum peak value of the input signal, second determining a current minimum peak value of the input signal, calculating an average of the current maximum peak value and the current minimum peak value to yield a DC offset estimate and subtracting the DC offset estimate from the input signal to yield a frequency compensated output signal.

There is also provided in accordance with the present invention, an apparatus for frequency offset compensation comprising first means for receiving an input signal wherein frequency offsets have been translated to DC offsets, second means for determining a current maximum peak value of the input signal, third means for determining a current minimum peak value of the input signal, fourth means for calculating an average of the current maximum peak value and the current minimum peak value to yield a DC offset estimate and fifth means for subtracting the DC offset estimate from the input signal to yield a frequency compensated output signal.

There is further provided in accordance with the present invention, an apparatus for frequency offset compensation comprising first means for receiving an input signal wherein frequency offsets have been translated to DC offsets, second means for determining a current maximum peak value of the input signal comprising, means for comparing the input signal with a previous maximum peak value, means for adding the current maximum peak value to a first difference between the input signal and the previous maximum peak value, the first difference multiplied by a maximum charge coefficient to yield the current maximum peak value if the input signal is greater than the previous maximum peak value, means for subtracting a second difference between the current maximum peak value and the input signal multiplied by a maximum discharge coefficient from the previous maximum peak value to yield the current maximum peak value if the input signal is not greater than the previous maximum peak value, third means for determining a current minimum peak value of the input signal comprising, means for comparing the input signal with a previous minimum peak value, means for subtracting a first difference between the current minimum peak value and the input signal, the first difference multiplied by a minimum discharge coefficient and subtracted from the previous minimum peak value to yield the current minimum peak value if the input signal is not greater than the previous maximum peak value, means for adding the current minimum peak value to a second difference between the input signal and the previous minimum peak value, the second difference multiplied by a minimum charge coefficient to yield the current minimum peak value if the input signal is greater than the previous minimum peak value, fourth means for calculating an average of the current maximum peak value and the current minimum peak value to yield a DC offset estimate and fifth means for subtracting the DC offset estimate from the input signal to yield a frequency compensated output signal.

BRIEF DESCRIPTION OF THE DRAWINGS

The invention is herein described, by way of example only, with reference to the accompanying drawings, wherein:

FIG. 5 is a pseudo code listing illustrating the gear shift logic portion of the DC estimation block in more detail;

DETAILED DESCRIPTION OF THE INVENTION

Notation Used Throughout

Figure 1A:
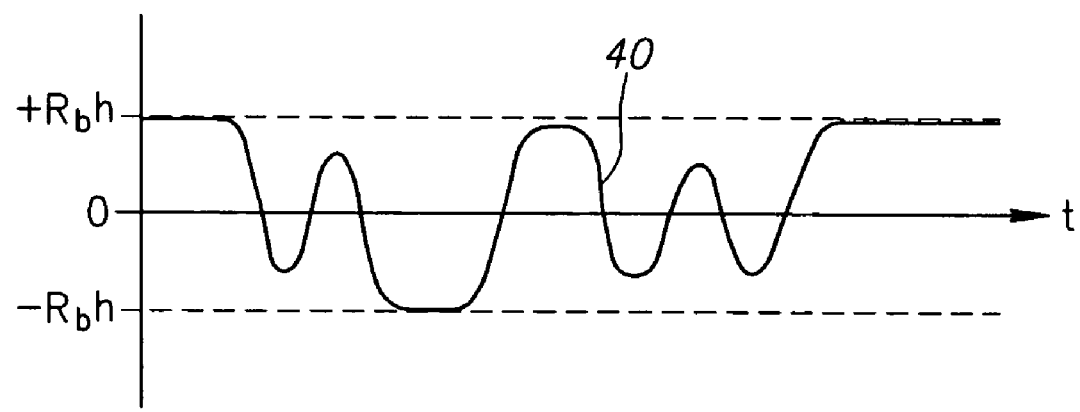
FIG. 1A illustrates an example baseband signal at the output of the detector without frequency offsets present at its input.

The following notation is used throughout this document.

| Term | Definition |
|------|------------|
| AFC | Automatic Frequency Control |
| AHDL | Adaptive Hard Decision Logic |
| ASIC | Application Specific Integrated Circuit |
| BER | Bit Error Rate |
| DC | Direct Current |
| FM | Frequency Modulation |
| FPGA | Field Programmable Gate Array |
| FSK | Frequency Shift Keying |
| GFSK | Gaussian Frequency Shift Keying |
| HDL | Hardware Description Language |
| IF | Intermediate Frequency |
| LO | Local Oscillator |
| NCO | Numerically Controlled Oscillator |
| RAM | Random Access Memory |
| RF | Radio Frequency |

DETAILED DESCRIPTION OF THE INVENTION

The present invention comprises an automatic frequency control (AFC) mechanism for frequency offset compensation in a digital receiver. The mechanism is a nonlinear adaptive mechanism that uses DC estimation and compensation in a feed-forward manner. The mechanism can be used, as shown in an example embodiment, in a multi-stage scheme to perform frequency offset compensation of an input signal for use by subsequent processing stages. The present invention is well suited for use in a digital FSK receiver such as a Gaussian Frequency Shift Keying (GFSK) detector constructed according to the Bluetooth specification. The mechanism is based on translating the frequency offsets in the signal to DC offsets and then compensating for the ambiguity in the DC bias utilizing accurate DC estimation and elimination. A gear shift mechanism is also incorporated that enables (1) fast frequency offset compensation for reception of the beginning portion of a packet (e.g., the redundant Bluetooth access code and header, during which a higher BER may be tolerated), and (2) relatively slow frequency offset compensation during reception of the payload portion of the packet, wherein the mechanism only needs to be fast enough to accommodate the 40 Hz/μsec maximum frequency drift rate that the Bluetooth specification permits.

The DC estimation mechanism used to perform frequency offset compensation is based on maximum and minimum peak determination and tracking. At the output of the demodulator, where the phase changes (or frequency deviations) in the modulated signal are recovered, the maximum and minimum peaks are found and averaged to generate a DC estimate. The DC estimate represents the frequency offset error to be compensated and is then subtracted from the input signal to yield a frequency offset compensated output signal.

It is noted that the present invention is not limited to use with any particular modulation or communication system. Throughout this document the invention is described in reference to a Bluetooth communication system. Note that the invention is not limited to this communications system, as one skilled in the relevant electrical arts can apply the frequency offset compensation mechanism of the present invention to other communication systems without departing from the spirit and scope of the present invention. Depending on the particular application and implementation, the invention is applicable for use with a multitude of communication systems, modulations and protocols. In general, the frequency offset compensation mechanism of the present invention is applicable in system where frequency offset is translated to a DC offset such as in systems employing differential detection. Such systems may be encountered not only in wireless communication systems, such as those based on the Bluetooth standard, but also in non-wireless or non communication systems.

It is also noted that the application of the present invention is not limited for use in performing frequency compensation. The mechanism of the present invention may be used to perform DC offset correction on any input signal and is not limited for use with the phase or frequency deviation signal recovered by the demodulator. For example, the mechanism may also be used to remove DC offsets in both the I and Q signals received from the RF front end circuitry.

Figure 2:
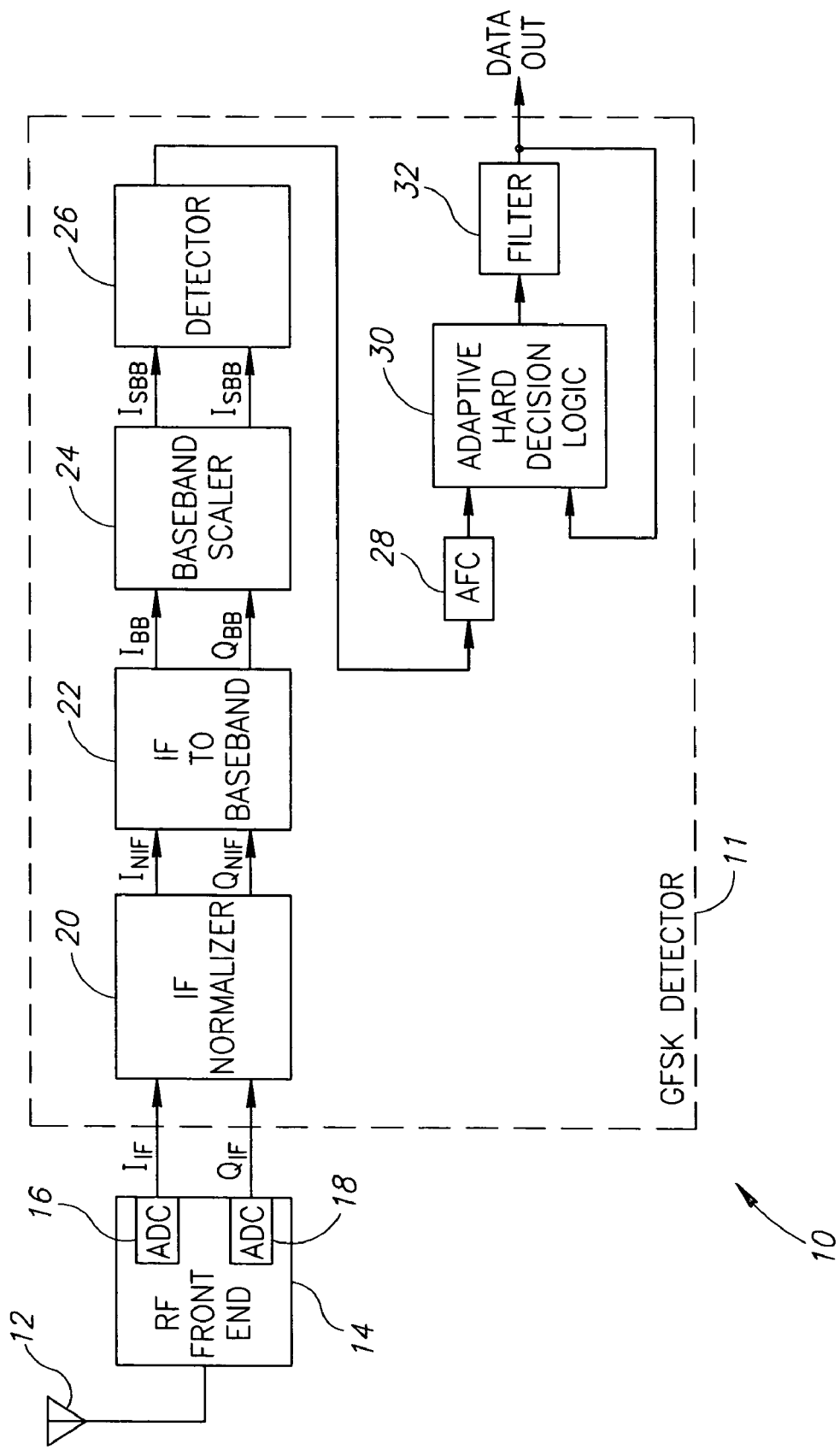
FIG. 2 is a block diagram illustrating an example GFSK receiver including an automatic frequency control (AFC) block incorporating the frequency offset compensation mechanism of the present invention.

A block diagram illustrating an example GFSK detector including an automatic frequency control (AFC) mechanism incorporating the frequency offset compensation scheme of the present invention is shown in FIG. 2. The example receiver, generally referenced 10, comprises an antenna 12, RF front end 14 including analog to digital converter 16 for the in phase I signal and analog to digital converter 18 for the quadrature phase Q signal, IF normalizer 20, IF to baseband converter 22, baseband scaler 24, detector 26, automatic frequency control (AFC) 28, adaptive hard decision logic (AHDL) 30 and filter 32.

The RF front end performs the amplification, mixing and filtering functions to generate both I and Q signal paths at low frequencies. The I and Q signals are input to the IF normalizer which is responsible for several tasks including DC offset compensation, prescaling and Automatic Gain Control (AGC) logic management for the entire receiver. Note that the term normalizer is intended to indicate that the IF signals are processed in order to bring their amplitudes to within a predefined optimal working region such that they may be handled properly by subsequent processing stages within the GFSK detector 11.

Figure 1B:
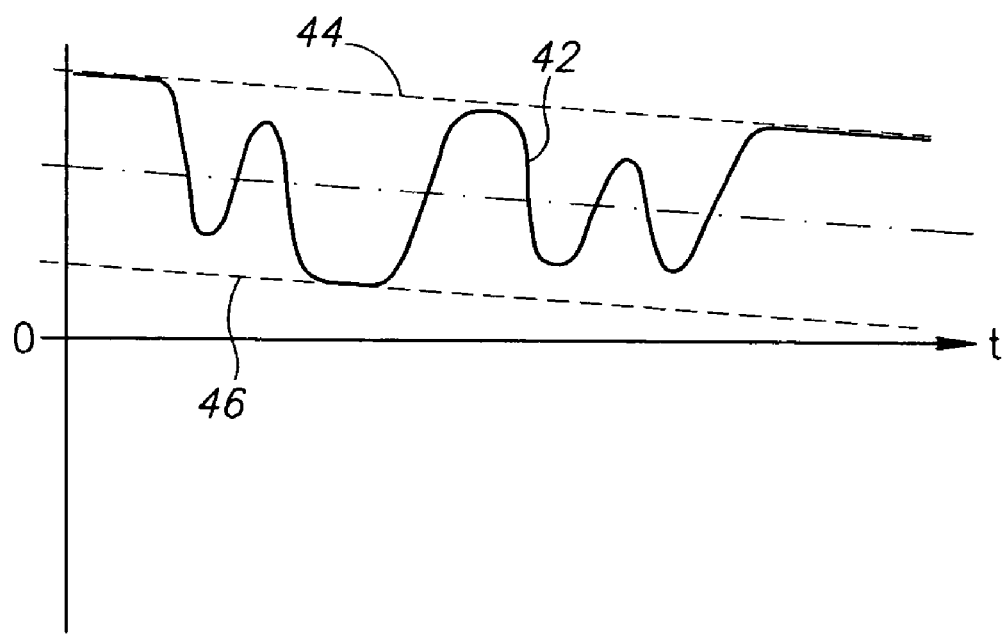
FIG. 1B illustrates an example baseband signal at the output of the detector with a slowly varying frequency offset present at its input.

It is important that the detector be of the type that translates frequency offset in the input signal to a DC offset. In the example system presented herein, the detector is a differential type detector having such characteristics. The DC offsets present in the signal output of the detector actually represent the frequency offsets. The baseband signal, which can be expressed as the recovered $\Delta\phi$ at any given instance (forming the Gaussian shaped data signal) rides on DC offsets derived from the frequency offsets present in the signal, such as is shown in FIG. 1B. Thus, the problem of compensating for frequency offsets has been translated to a problem of compensating for DC offsets which is a much simpler task.

Figure 3:
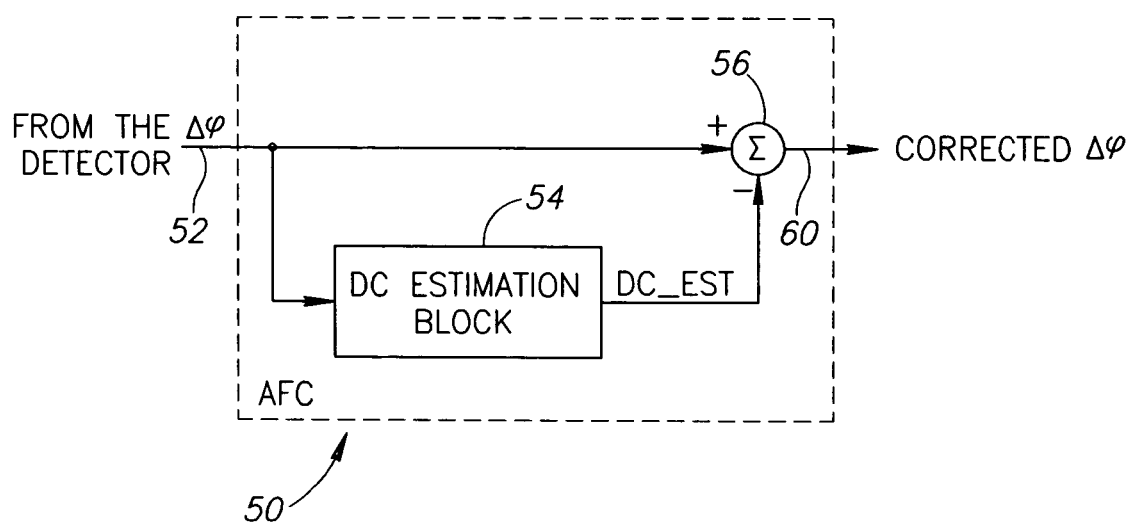
FIG. 3 is a block diagram illustrating the AFC block of the present invention in more detail.

A block diagram illustrating the AFC block of the present invention in more detail is shown in FIG. 3. The main component of the AFC, generally referenced 50, is the DC estimation block 54 which receives the $\Delta\phi$ input signal 52 output from the detector. The DC_EST signal 58 output of the DC estimation block is subtracted from the $\Delta\phi$ input signal via subtractor 56. The output 60 of the subtractor comprises the corrected or frequency compensated $\Delta\phi$. At this stage of processing in the GFSK detector 11, frequency offsets have been removed from the signal and the signal is ready to be processed by subsequent processing, e.g., equalization, slicing, etc.

The function of the AFC block 50 is to compensate for the influence of frequency deviations of the input spectrum from its intended center (i.e. the IF frequency) on the output data. It is noted that in the example implementation presented herein, the range of frequency errors that must be handled at IF is the sum of the 75 kHz allowed error in the transmitted carrier plus about 50 kHz in the receiver's LO (typically being derived from a 20 ppm crystal) plus up to 40 kHz of allowed frequency drift during packet transmission plus 15 kHz caused by inaccuracies in the receiver's sampling, thus totaling 180 kHz of possible frequency offset.

The AFC correction is performed in an open loop feed forward manner. If moving averaging is not used, the DC estimation and compensation impose no delay on the data path. If moving averaging is used, a small delay is imposed.

Figure 4:
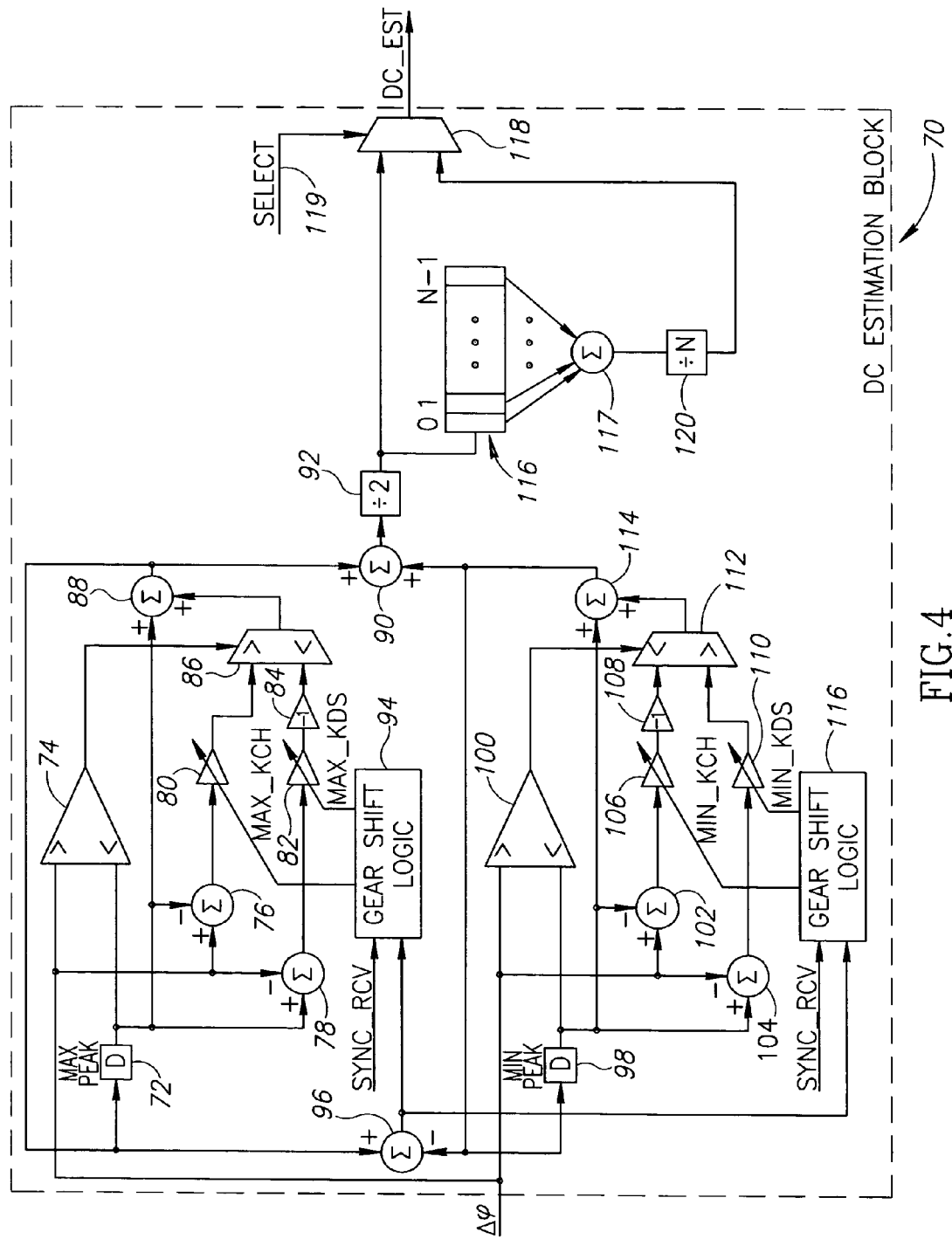
FIG. 4 is a block diagram illustrating the DC estimation block portion of the AFC of the present invention in more detail.

The operation of the DC offset compensation module will now be described in more detail. A block diagram illustrating the DC estimation block portion of the AFC of the present invention in more detail is shown in FIG. 4. Frequency deviations during symbols are translated to DC offsets and added to the phase difference output of the differential detector. Thus, the role of the AFC is to estimate and compensate for the DC offset of the differential detector output. The technique used to estimate the DC offset is based on tracking the upper and lower peaks of the signal using particular time constants which can be configured dynamically over time in accordance with the tracking speed required at any point in time.

The operation of the DC estimation block 70 is based on a peak detection mechanism. The block comprises maximum and minimum peak detectors for the $\Delta\phi$ input signal. Updates of the peak values triggered by gain changes are applied to both branches in common. The DC estimation block, generally referenced 70, is divided into two portions: a maximum determination portion and a minimum determination portion. The operation of both is similar. Register 72 stores the previous maximum peak value. The maximum peak value is compared via comparator 74 to the input signal $\Delta\phi$ (i.e. signal with DC offset representing a frequency offset). The output of the comparator 74 controls multiplexer 86. If the input signal is greater, the previous maximum peak value is subtracted from the input signal via summer 76 and multiplied by a maximum charge coefficient max_kch 80. The result is added via summer 88 to the previous maximum peak value to yield the current maximum peak value. The current maximum peak value replaces the previous maximum peak value at the next clock cycle.

If the input signal is not greater than the previous maximum peak value, the input signal is subtracted from the previous maximum peak value via summer 78, the difference multiplied by maximum discharge coefficient max_kds 82 and subtracted (multiply by minus one 84) from the previous maximum peak value via summer 88. Multiplexer 86 selects to either charge or discharge the maximum peak value in accordance with the result of the comparator 74. Gear shift logic 94 provides the charge and discharge coefficients max_kch and max_kds.

In similar fashion, the minimum peak value is determined. Register 98 stores the previous minimum peak value. The minimum peak value is compared via comparator 100 to the input signal (i.e. signal with DC offset representing a frequency offset). If the input signal is not greater, the input signal is subtracted from the previous minimum peak value via summer 102 and multiplied by a minimum charge coefficient min_kch 106. The result is subtracted (multiply by minus one 108) via summer 114 from the previous minimum peak value to yield the current minimum peak value. The current minimum peak value replaces the previous minimum peak value at the next clock cycle.

If the input signal is greater than the previous minimum peak value, the previous minimum peak value is subtracted from the input signal via summer 104, the difference multiplied by minimum discharge coefficient min_kds 110 and added to the previous minimum peak value via summer 114. Multiplexer 112 selects to either charge or discharge the minimum peak value in accordance with the result of the comparator 100. Gear shift logic 116 provides the charge and discharge coefficients min_kch and min_kds. The SYNC_RCV signal, which is input to the gear shift logic 94, 116, indicates the instance at which the baseband processing portion of the receiver has successfully detected the access code of the packet (preceding the payload) at which time the gear-shift logic may switch to the set of slower time constants for charging and discharging the peak detectors.

The average of the maximum and minimum peak values is produced via summer 90 and divide by two 92. The result is the DC estimate of the input signal that is output through multiplexer 118. Note that alternatively, a moving average can be generated over N DC estimate averages. Memory 116 comprises shift register means, RAM, register file, or other suitable memory means for storing history of the latest N DC estimate values. To generate an output, the N values stored in the memory are summed via summer 117 and divided by N (divide by N 120) to generate a moving average DC estimate output through the multiplexer 118. A select control signal 119 is adapted to select either the single average output or the moving average output calculated over the previous N average values.

Thus, the DC estimation circuit functions to track the maximum and minimum peaks of the input signal. The average of the maximum and minimum peak values is taken as the estimate of the DC offset. The charge and discharge coefficients determine how fast the circuit tracks changes in the peak values. The coefficients are generated by the gear shift logic 94, 116. The input to both gear shift logic circuits is the difference between the maximum and minimum peak values as generated by subtractor 96. Both gear shift logic circuits track this difference and adjust their coefficient outputs in accordance therewith as described below.

A pseudo code listing illustrating the gear shift logic portion of the DC estimation block in more detail is shown in FIG. 5. Shown in Listing 1 is pseudo code of an example of the implementation of the gear shift logic. Charge and discharge coefficients for both the maximum and minimum peaks are provided. In the early portion of a packet, it is desirable for the peak detector to respond very quickly to changes. In the Bluetooth example provided herein, the peak detector should respond in a quick manner during reception of the first 68 symbols of a packet comprising the preamble and access-code (i.e. acquisition phase) since performance may be compromised due to the redundant nature of this portion of the packet. Once synchronization is accomplished (based on detection of the access-code) it is preferable to maintain the DC estimation as quiet (i.e. stable) as possible and to limit the AFC mechanism to slow tracking of drifts which may be present during the reception of the payload portion of the packet. Note that for certain types of packets supported by the Bluetooth specification, the loss of a single payload symbol will result in the loss of the entire packet. The gear shifting mechanism of the present invention provides the dynamic configuration of the charge and discharge time constants for both the maximum and minimum branches of the DC estimation block.

The gear shift mechanism is also intended to address scenarios where the peak-to-peak changes in the input signal are not within a predefined expected range. This normal range, which corresponds to the nominal frequency deviations typically recovered by the demodulator (e.g. ±160 kHz for a nominal Bluetooth signal), could be greatly exceeded as a result of noise or interference. Alternatively, it may be zero when a long sequence of "1"s or "0"s is received, resulting in what would appear as DC at the demodulator output (the minimum and maximum peaks are equal). In order to prevent compensation that is catastrophic for these two types of extreme cases, limiters within the gear shift mechanism ensure that even if the signal is not alternating, or is alternating too much, the mechanism will not introduce significant performance degradation (as experienced through the recovered BER).

Thus, the mechanism is operative to limit the distance between detected maximum and minimum peaks to a certain normalized predetermined range. Departure from the normalized range causes changes in the time constants that will compensate for the effect (e.g., significant increase in the time constants whenever an 'unreasonable' change is experienced in a peak detector, resulting in slow or filtered response to that instantaneous input. Once the maximum and minimum peak detectors are within a certain proximity to each other, which is slightly below the allowed range, the discharging may even be disabled completely). Thus, the gear shift logic is operative to dynamically adjust the maximum and minimum charge and discharge coefficients so as to maintain the difference between the maximum and minimum detected peaks to within a predetermined normalized range.

As indicated in Listing 1, the charge coefficients are shortened (i.e. increased gain) when it is desired to track the maximum and minimum peaks relatively fast while retaining a stable level of the peaks such as during the beginning of the packet before synchronization. After synchronization, the charge/discharge time coefficients of both the maximum peak detector (i.e. upper levels of the signal) and minimum peak detector (i.e. lower levels of the signal) should be extended (i.e. reduced gain) to provide slow tracking. If the maximum and minimum peaks get too far apart from each other, discharging should be made as fast as possible. If the maximum and minimum peaks get too close to each other, the charge coefficients should be made as fast as possible. Note that the condition 'AFTER_SYNC' in the 'IF' statement of the first line of Listing 1 corresponds to the appropriate transition instance in the REC_SYNC signal of FIG. 4.

Figure 6:
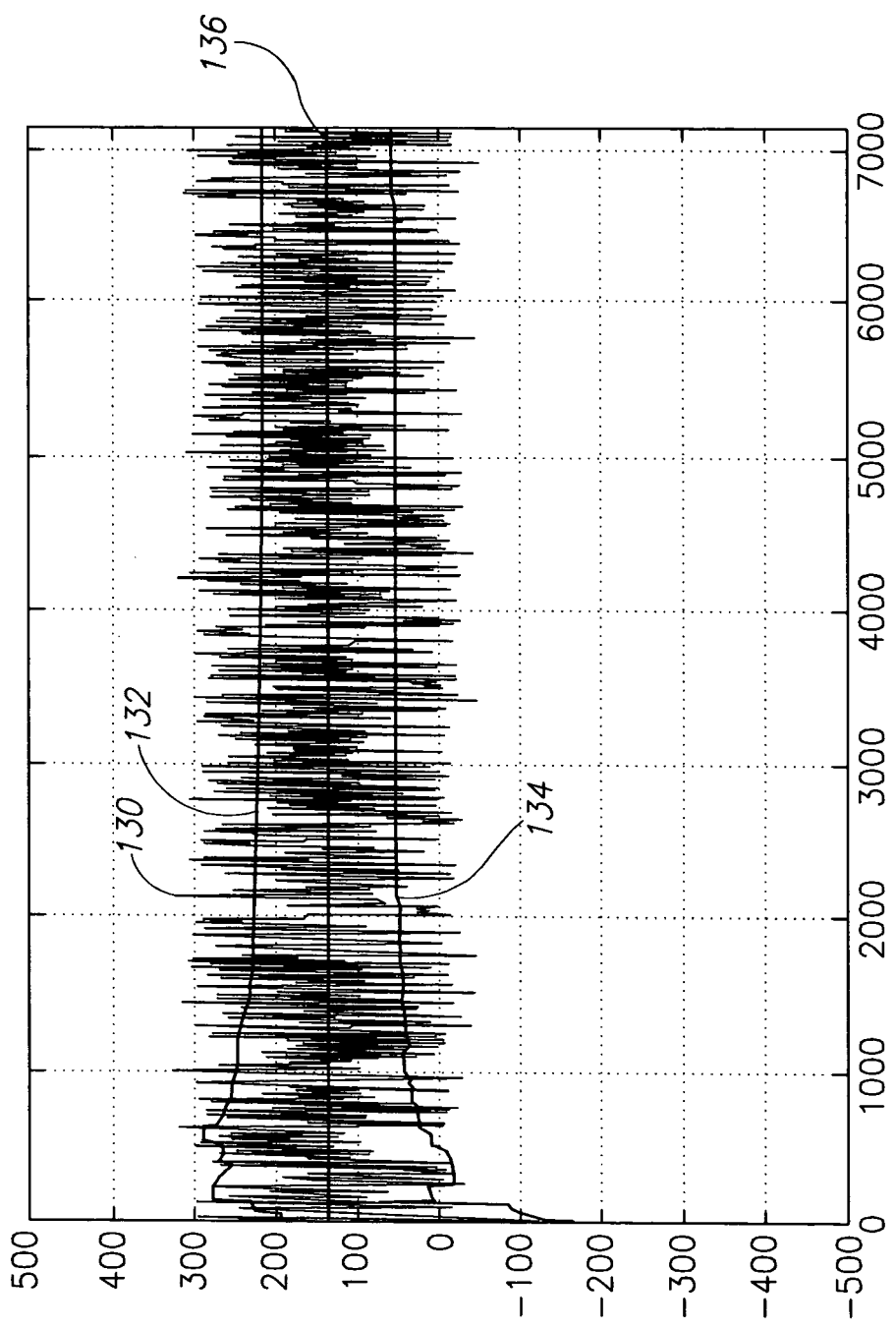
FIG. 6 illustrates the estimated DC signal (DC_EST) output by the DC estimation block of the present invention superimposed onto the sample input signal.

A diagram illustrating the operation of the AFC of the present invention applied to a sample input signal is shown in FIG. 6. The estimated DC signal (DC_EST) output by the DC estimation block 54 (FIG. 3) is shown superimposed onto the sample input signal. The signal trace 130 represents the output signal $\Delta\phi$ (i.e. the phase differences) from the detector with frequency offsets translated to DC offsets. Note the relatively high offset from zero wherein the graph represents a frequency offset of 160 kHz. Curve 132 represents the maximum peak as generated by the maximum peak detector. During most of the packet it does not appear to reach the actual peaks due to the filtering imposed by the tracking time constants. Curve 134 represents the minimum peak as generated by the minimum peak detector. Here too, curve 134 reaches the actual minimum peaks of the signal only at the beginning portion of the signal and is later smoothened at a level closer to the signal's middle, as a result of the tracking time-constant filtering. The curve 136 represents the DC estimate generated from the average of the maximum and minimum peak detectors (the average of curves of 134 and 132). This DC estimate is then used to compensate the input signal by being subtracted from the input signal, before the slicing is performed to recover the actual data bits. Note that the diagram shows only the detector output signal before compensation.

Figure 7:
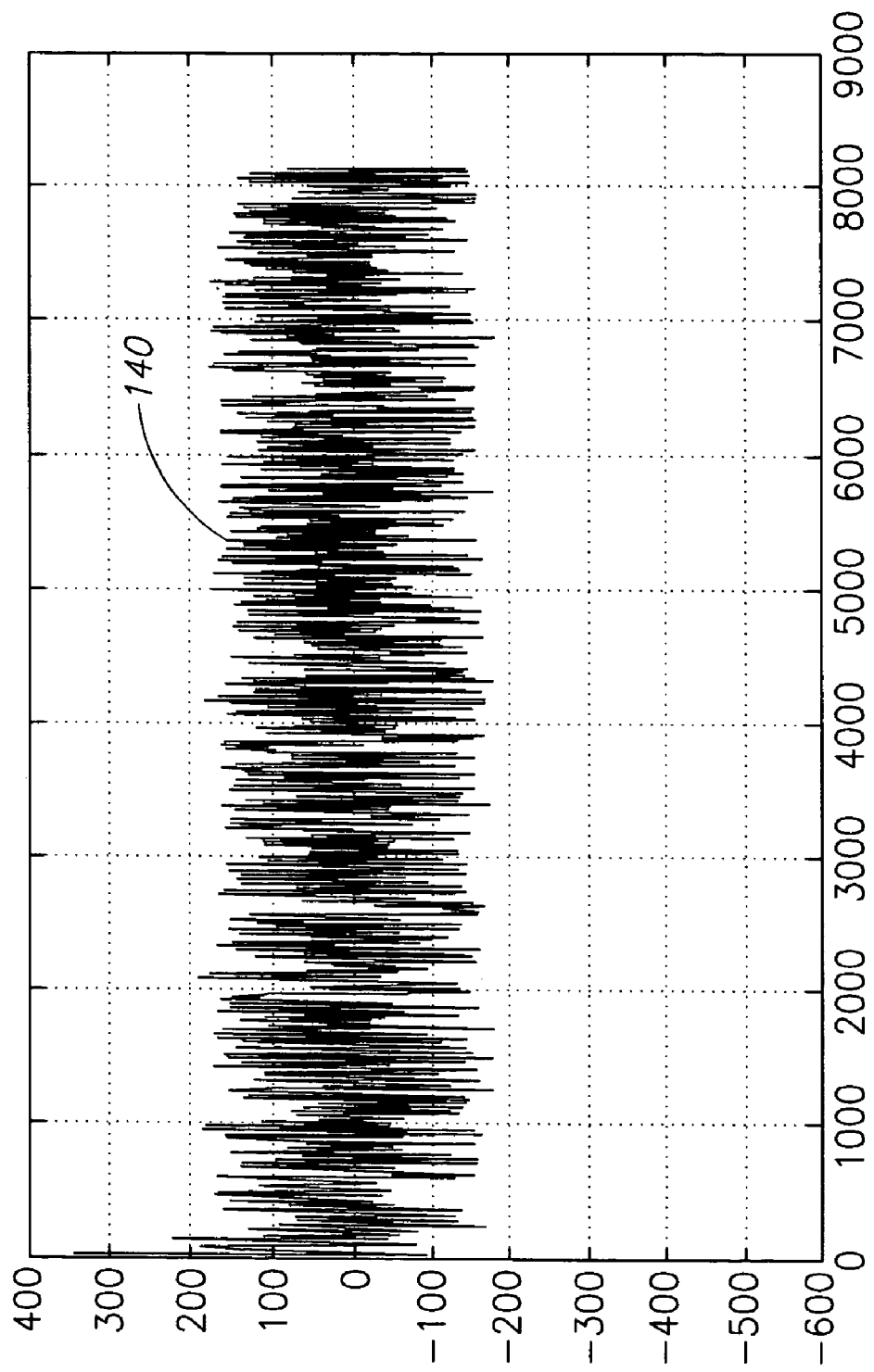
FIG. 7 illustrates the corrected signal compensated for DC offsets and produced by subtracting the estimated DC signal from the sample input signal.

The sample input signal after compensation, is shown in FIG. 7. The DC estimate calculated is subtracted from the sample input signal. The compensated signal is now centered around zero, thus being in optimal condition for slicing to recover the transmitted data.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of frequency offset compensation, comprising:
   receiving an input signal wherein frequency offsets have been translated to DC offsets;
   first determining a current maximum peak value of said input signal;
   second determining a current minimum peak value of said input signal;
   calculating, in a communication circuitry, an average of said current maximum peak value and said current minimum peak value to yield a DC offset estimate; and
   subtracting said DC offset estimate from said input signal to yield a frequency compensated output signal;
   wherein said step of determining said current maximum peak value comprises the steps of:
   comparing said input signal with a previous maximum peak value;
   if said input signal is greater than said previous maximum peak value, adding said previous maximum peak value to a first difference between said input signal and said previous maximum peak value, said first difference multiplied by a maximum charge coefficient to yield said current maximum peak value; and
   if said input signal is not greater than said previous maximum peak value, subtracting a second difference between said previous maximum peak value and said input signal multiplied by a maximum discharge coefficient from said previous maximum peak value to yield said current maximum peak value.

2. The method according to claim 1, further comprising the step of generating said maximum charge coefficient and said maximum discharge coefficient in accordance with the occurrence of a specific event.

3. The method according to claim 1, further comprising the step of generating said maximum charge coefficient and said maximum discharge coefficient so as to limit the distance between detected maximum peaks and minimum peaks to within a predetermined range.

4. A method of frequency offset compensation, comprising:
   receiving an input signal wherein frequency offsets have been translated to DC offsets;
   first determining a current maximum peak value of said input signal;
   second determining a current minimum peak value of said input signal;
   calculating, in a communication circuitry, an average of said current maximum peak value and said current minimum peak value to yield a DC offset estimate; and
   subtracting said DC offset estimate from said input signal to yield a frequency compensated output signal;
   wherein said step of determining said current minimum peak value comprises the steps of:
   comparing said input signal with a previous minimum peak value;
   if said input signal is not greater than said previous minimum peak value, subtracting a first difference between said previous minimum peak value and said input signal, said first difference multiplied by a minimum discharge coefficient and subtracted from said previous minimum peak value to yield said current minimum peak value; and
   if said input signal is greater than said previous minimum peak value, adding said previous minimum peak value to a second difference between said input signal and said previous minimum peak value, said second difference multiplied by a minimum charge coefficient to yield said current minimum peak value.

5. The method according to claim 4, further comprising the step of generating said minimum charge coefficient and said minimum discharge coefficient in accordance with the occurrence of a specific event.

6. The method according to claim 4, further comprising the step of generating said minimum charge coefficient and said minimum discharge coefficient so as to limit the distance between detected maximum peaks and minimum peaks to within a predetermined range.

7. The method according to claim 1, further comprising the step of calculating a moving average over N values of said average of said current maximum peak value and said current minimum peak value, where N is an integer.

8. An apparatus for frequency offset compensation, comprising:
   first means for receiving an input signal wherein frequency offsets have been translated to DC offsets;
   second means for determining a current maximum peak value of said input signal;
   third means for determining a current minimum peak value of said input signal;
   fourth means for calculating an average of said current maximum peak value and said current minimum peak value to yield a DC offset estimate; and
   fifth means for subtracting said DC offset estimate from said input signal to yield a frequency compensated output signal;
   wherein said second means for determining said current maximum peak value comprises:
   means for comparing said input signal with a previous maximum peak value;
   means for adding said previous maximum peak value to a first difference between said input signal and said previous maximum peak value, said first difference multiplied by a maximum charge coefficient to yield said current maximum peak value if said input signal is greater than said previous maximum peak value; and
   means for subtracting a second difference between said previous maximum peak value and said input signal multiplied by a maximum discharge coefficient from said previous maximum peak value to yield said current maximum peak value if said input signal is not greater than said previous maximum peak value.

9. The apparatus according to claim 8, further comprising gear shift logic means for generating said maximum charge coefficient and said maximum discharge coefficient in accordance with the occurrence of specific events.

10. The apparatus according to claim 8, further comprising gear shift logic means for generating said maximum charge coefficient and said maximum discharge coefficient so as to limit the distance between detected maximum peaks and minimum peaks to within a predetermined range.

11. An apparatus for frequency offset compensation, comprising:
   first means for receiving an input signal wherein frequency offsets have been translated to DC offsets;
   second means for determining a current maximum peak value of said input signal;
   third means for determining a current minimum peak value of said input signal;
   fourth means for calculating an average of said current maximum peak value and said current minimum peak value to yield a DC offset estimate; and
   fifth means for subtracting said DC offset estimate from said input signal to yield a frequency compensated output signal;
   wherein said third means for determining said current minimum peak value comprises:
      means for comparing said input signal with a previous minimum peak value;
      means for subtracting a first difference between said previous minimum peak value and said input signal, said first difference multiplied by a minimum discharge coefficient and subtracted from said previous minimum peak value to yield said current minimum peak value if said input signal is not greater than said previous minimum peak value; and
      means for adding said previous minimum peak value to a second difference between said input signal and said previous minimum peak value, said second difference multiplied by a minimum charge coefficient to yield said current minimum peak value if said input signal is greater than said previous minimum peak value.

12. The apparatus according to claim 11, further comprising gear shift logic means for generating said minimum charge coefficient and said minimum discharge coefficient in accordance with the occurrence of a specific event.

13. The apparatus according to claim 11, further comprising gear shift logic means for generating said minimum charge coefficient and said minimum discharge coefficient so as to limit the distance between detected maximum peaks and minimum peaks to within a predetermined range.

14. The apparatus according to claim 8, further comprising sixth means for calculating a moving average over N values of said average of said current maximum peak value and said current minimum peak value, where N is an integer.

15. An apparatus for frequency offset compensation, comprising:
   first means for receiving an input signal wherein frequency offsets have been translated to DC offsets;
   second means for determining a current maximum peak value of said input signal comprising:
      means for comparing said input signal with a previous maximum peak value;
      means for adding said previous maximum peak value to a first difference between said input signal and said previous maximum peak value, said first difference multiplied by a maximum charge coefficient to yield said current maximum peak value if said input signal is greater than said previous maximum peak value; and
      means for subtracting a second difference between said previous maximum peak value and said input signal multiplied by a maximum discharge coefficient from said previous maximum peak value to yield said current maximum peak value if said input signal is not greater than said previous maximum peak value;
   third means for determining a current minimum peak value of said input signal comprising:
      means for comparing said input signal with a previous minimum peak value;
      means for subtracting a first difference between said previous minimum peak value and said input signal, said first difference multiplied by a minimum discharge coefficient and subtracted from said previous minimum peak value to yield said current minimum peak value if said input signal is not greater than said previous minimum peak value; and
      means for adding said previous minimum peak value to a second difference between said input signal and said previous minimum peak value, said second difference multiplied by a minimum charge coefficient to yield said current minimum peak value if said input signal is greater than said previous minimum peak value;
   fourth means for calculating an average of said current maximum peak value and said current minimum peak value to yield a DC offset estimate; and
   fifth means for subtracting said DC offset estimate from said input signal to yield a frequency compensated output signal.

16. The apparatus according to claim 15, further comprising gear shift logic means for generating said maximum charge coefficient and said maximum discharge coefficient so as to limit the distance between detected maximum peaks and minimum peaks to within a predetermined range.

17. The apparatus according to claim 15, further comprising gear shift logic means for increasing said maximum discharge coefficient and said minimum discharge coefficient in response to the distance between detected maximum peaks and minimum peaks exceeding a predetermined amount.

18. The apparatus according to claim 15, further comprising gear shift logic means for increasing said maximum charge coefficient and said minimum charge coefficient in response to the distance between detected maximum peaks and minimum peaks being less than a predetermined amount.

19. An apparatus for frequency offset compensation, comprising:
   circuitry for means for receiving an input signal wherein frequency offsets have been translated to DC offsets;
   circuitry for determining a current maximum peak value of said input signal;
   circuitry for determining a current minimum peak value of said input signal;
   circuitry for calculating an average of said current maximum peak value and said current minimum peak value to yield a DC offset estimate; and
   circuitry for subtracting said DC offset estimate from said input signal to yield a frequency compensated output signal;
   wherein said circuitry for determining said current maximum peak value comprises:
      circuitry for comparing said input signal with a previous maximum peak value;
      circuitry for adding said previous maximum peak value to a first difference between said input signal and said previous maximum peak value, said first difference multiplied by a maximum charge coefficient to yield said current maximum peak value if said input signal is greater than said previous maximum peak value; and
      circuitry for subtracting a second difference between said previous maximum peak value and said input signal multiplied by a maximum discharge coefficient from said previous maximum peak value to yield said current maximum peak value if said input signal is not greater than said previous maximum peak value.

20. An apparatus for frequency offset compensation, comprising:
- circuitry for receiving an input signal wherein frequency offsets have been translated to DC offsets;
- circuitry for determining a current maximum peak value of said input signal;
- circuitry for determining a current minimum peak value of said input signal;
- circuitry for calculating an average of said current maximum peak value and said current minimum peak value to yield a DC offset estimate; and
- circuitry for subtracting said DC offset estimate from said input signal to yield a frequency compensated output signal;
- wherein said circuitry for determining said current minimum peak value comprises:
  - circuitry for comparing said input signal with a previous minimum peak value;
  - circuitry for subtracting a first difference between said previous minimum peak value and said input signal, said first difference multiplied by a minimum discharge coefficient and subtracted from said previous minimum peak value to yield said current minimum peak value if said input signal is not greater than said previous minimum peak value; and
  - circuitry for adding said previous minimum peak value to a second difference between said input signal and said previous minimum peak value, said second difference multiplied by a minimum charge coefficient to yield said current minimum peak value if said input signal is greater than said previous minimum peak value.

* * * * *